United States Patent Office 3,703,595
Patented Nov. 21, 1972

3,703,595
GLASS-CLEAR POLYAMIDES
Georg Falkenstein, Ludwigshafen, Hans Georg Peine, Frankenthal, and Helmut Doerfel, Paul Raff, and Ludwig Schuster, Ludwigshafen, Germany, assignors to Badische Anilin- & Soda-Fabrik Aktiengesellschaft, Ludwigshafen (Rhine), Germany
No Drawing. Continuation-in-part of application Ser. No. 674,102, Oct. 10, 1967. This application Apr. 20, 1970, Ser. No. 30,213
Claims priority, application Germany, Oct. 18, 1966, P 15 95 354.5
Int. Cl. C08g 20/20
U.S. Cl. 260—78 R     4 Claims

ABSTRACT OF THE DISCLOSURE

Glass-clear polyamides consisting essentially of polymeric condensation products of a mixture of stereoisomers of 2,2-bis-(4-aminocyclohexyl)-propane and an aliphatic or carbocyclic dicarboxylic acid having six to ten carbon atoms and, if desired, caprolactam or adipic acid and hexamethylene-diamine. The polyamides are useful for the production of moldings.

---

The present application is a continuation-in-part of application, Ser. No. 674,102, which was filed on Oct. 10, 1967 and which has now been abandoned.

It is known that transparent polyamides can be prepared by polycondensing salts of the diamine/dicarboxylic acid type at elevated temperature and atmospheric or superatmospheric pressure. Examples of diamines are aliphatic diamines having branched carbon chains, such as trimethylhexamethylenediamine, cyclohexane derivatives, such as bis-(4-aminocyclohexyl)-methane, bis-(4-amino-3-methylcyclohexyl)-methane and 3-aminomethyl-(3,5,5-trimethyl-1-cyclohexyl)-amine or diamines derived from fluorene, such as 9,9-bis-(3-aminopropyl)-fluorene. Clear polyamides based on tetrahydrotricyclopentadienylenediamines are also known.

The starting materials for these polyamides are in some cases very difficultly accessible. Moreover these polyamides have relatively low softening points or are attacked by organic solvents. Some of these polyamides crystallized when exposed to elevated temperature, particularly upon boiling with water, and this causes turbidity and changes in shape in moldings prepared from these polyamides.

It is also known that transparent polyamide moldings can be prepared by polycondensing mixtures of two or more polyamide-forming starting materials, for example a mixture of caprolactam, the salt of bis-(4-aminocyclohexyl)-methane and adipic acid and the salt of hexamethylenediamine and adipic acid, or by mixing clear copolyamides with conventional homopolyamides. These copolymers or mixtures of polyamides usually have a lower softening point than homopolyamides and moreover they are not resistant to organic solvents. Furthermore they exhibit considerable cold flow and often form globulites resulting in turbidity.

We have now found that glass-clear polyamides which do not have the said disadvantage can be prepared by polycondensation of diamines with dicarboxylic acids or derivatives thereof, such as esters or chlorides, with or without other polyamide-forming substances, by polycondensing a special isomer mixture of bis-(4-aminocyclohexyl)-propane having the empirical formula $C_{15}H_{30}N_2$ with an aliphatic or carbocyclic dicarboxylic acid having six to ten carbon atoms or a derivative thereof.

The said polyamides are particularly stable when the 2,2-bis-(4-aminocyclohexyl)-propane used for their production consists to the extent of 50 to 80% by weight, preferably 50 to 70% by weight, of trans, trans isomers. Glass-clear polyamides according to this invention consist essentially of the polymeric condensation products of (A) a solid mixture of stereoisomers of 2,2-bis-(4-aminocyclohexyl)-propane comprising 50 to 80% by weight, preferably 50 to 70% by weight, of trans, trans isomers, the balance being cis, trans and cis, cis isomers with the proviso that the content of cis, cis isomer is less than 10% by weight, (B) an aliphatic or carbocyclic dicarboxylic acid having from 6 to 10 carbon atoms and if desired, (C) 1 to 30% by weight with reference to the polyamide-forming compounds of caprolactam or of adipic acid and hexamethylene diamine in a stoichiometric ratio.

Production of glass-clear polyamides according to this invention is especially economical when the dicarboxylic acid used is adipic acid or derivatives thereof such as diesters or the dichloride. Homopolymers of adipic acid and said 2,2-bis-(4-aminocyclohexyl)-propane are moreover distinguished by a high softening point. This is 20° to 70° higher than that of conventional clear polyamides.

It is known from U.S. Pat. No. 2,516,585 to produce amorphous polyamides from terephthalic acid and bis(4-amino-3-methylcyclohexyl)methane, i.e. bis-cyclohexylmethane diamines nuclear substituted exclusively in the 3-position. As a result of the substitution the formation of hydrogen bonds is disturbed and the polyamides exhibit a relatively low strength. Furthermore these polyamides are less transparent than those according to this invention and tend to undergo after-crystallization.

From U.S. Pats. 2,512,606 and 2,585,163 it is known to produce polyamides from dicarboxylic acids having at least 6 carbon atoms and a mixture of stereoisomers of di-(4-amino-cyclohexyl)methane or similar dialicyclic diamines. A mixture of stereoisomers of dialicyclic diamines which is liquid at 25° C., i.e. has a low content of trans, trans isomer, is said to give clear and transparent polyamides, but opaque polyamides result, when a mixture of stereoisomers of dialicyclic diamines is used which is solid at 25° C., i.e. has a relatively high content of trans, trans isomer.

Therefore it is surprising that according to this invention clear and transparent polyamides should be produced by using a mixture of stereoisomers of 2,2-di(4-aminocyclohexyl) propane, which is solid at 25° C. and has a content of 50 to 80% by weight of the trans, trans isomer having a melting point of 76.6° C.

It is already known to prepare glass-clear polyamides from bis(4-aminocyclohexyl)methane and dodecane diacid by conventional polycondensation methods. These products have the disadvantage of course that they have a stronger tendency to subsequent crystallization under thermal stress than the products according to the present invention and thus to lose their transparency. Similarly the glass-clear polyamides from dimethyl-bis-(4-aminocyclohexyl)methane and dodecane diacid have an appreciably stronger tendency to subsequent crystallization than the corresponding polyamides based on adipic acid.

The glass-clear polyamides according to this invention may be prepared in the presence of up to 30% of other polyamide-forming starting materials, such as lactams or salts of conventional diamines and dicarboxylic acids, without these products losing their excellent optical properties. Among these copolyamides, those which contain salt of adipic acid and/or hexamethylendiamine caprolactam have particular industrial importance.

Dimethyl-bis-(4-aminocyclohexyl)-methane (2,2-bis(4-aminocyclohexyl)propane) having the empirical formula $C_{15}H_{30}N_2$ may be prepared by conventional methods by hydrogenation of dimethyl-bis-(4-hydroxyphenyl)-methane (2,2-bis(4-hydroxyphenyl)propane) with hydrogen under superatmospheric pressure and at elevated temperature in the presence of a nickel catalyst followed by amination of the resultant dihydroxydicyclohexylpropane compound with ammonia in the presence of a hydrogenation catalyst. For brevity dimethyl-bis-(4-amino-cyclohexyl)-methane (2,2 - bis(4 - aminocyclohexyl)-propane) will hereinafter be referred to as bisaminocyclohexylpropane.

By the said methods of manufacture, a mixture of stereoisomers of bisaminocyclohexylpropane is obtained in general, namely the trans,trans isomer as the main product, a smaller amount of cis, trans isomer and less than 10%, preferably 0.1 to 10% by weight of the cis,cis isomer. An isomer mixture containing 50 to 80%, preferably 50 to 70% by weight, of the trans,trans isomer is particularly suitable as the diamine component for the production of glass-clear polyamides. Said mixture has the consistency of a solid wax while the trans,trans isomer is a solid having a melting point of 76.6° C., the remainder of the stereoisomer mixture of cis,trans and cis,cis isomers is a liquid at 25° C. If a pure trans,trans diamine be used however there is obtained with adipic acid, (melting point of the salt 262° to 263° C.) a crystalline, non-transparent and brittle polyamide having too high a melting point for conventional melt-spinning methods. The isomer distribution of the mixtures may be determined by conventional methods, e.g., by gas chromatographic and nuclear-resonance spectro-scopic methods, and also the enrichment or separation of the isomers if desired and necessary can be carried out by conventional methods, such as fractional distillation and/or fractional crystallization. The isomers may for example be characterised by way of their trifluoracetyl derivatives (melting point of the derivative of the cis,cis isomer 175–177° C., of the cis,trans isomer 167–170° C., of the trans,trans isomer 224–225° C.).

Polyamides prepared by the process of the invention are glass-clear and do not crystallize even after prolonged heating in air or prolonged boiling in water, nor do they lose their transparency by these treatments. Homopolyamides prepared according to this invention have higher softening points, higher glass temperatures and higher impact strengths than other clear polyamides and have outstanding resistance to solvents. The new type of products have the advantage over conventional aliphatic polyamides (which are mainly distinguished by high toughness and strength) of higher flexural strength and stiffness in the temperature range from 80° to 160° C., lower water absorption and the advantage of complete transparency which is decisive for some uses. Compared with prior art clear copolyamides, the glass-clear homopolyamides prepared according to this invention and some of the copolyamides which contain the products according to this invention have the advantage of a considerably higher softening point, of higher dimensional stability under heat, of resistance to most organic solvents and of higher impact strength and flexural strength. The optical clarity of the invention polyamide is stable to boiling water and cooling from the melt in the course of twenty-four hours, said polyamide further having a glass temperature of at least about 160° C., said glass temperature being determined by registration of the heat flow in dependence on temperature in a Perkin-Elmer DSC-1 Calorimeter at a heating rate of 32° C./min./1 g. sample.

The dicarboxylic acids having six to ten carbon atoms used may be aliphatic dicarboxylic acids having linear or branched chains, such as adipic acid, suberic acid, azelaic acid, pimelic acid, sebacic acid, methylglutaric acid and trimethyladipic acid; aromatic dicarboxylic acids, such as isophthalic acid; araliphatic dicarboxylic acids, such as phenylene-bis-acetic acid; and cycloaliphatic dicarboxylic acids, such as cyclohexane dicarboxylic acids. It is advantageous to use linear aliphatic dicarboxylic acids, particularly adipic acid.

The processing characteristics of the high melting point homopolymers according to this invention may be improved by condensing in 1 to 30% of conventional polyamide-forming substances, such as lactams and salts of aliphatic dicarboxylic acids and diamines, without their other mechanical properties or resistance to solvents being appreciably changed. Glass-clear soluble copolyamides having increased softening points may on the other hand be prepared by polycondensation of at least 70% of a salt of bisaminocyclohexylpropane with a dicarboxylic acid and up to 30% of other polyamide-forming substances such as caprolactam and/or a mixture of adipic acid and hexamethylene diamine, preferably in a stoichiometric ratio.

Conventional polycondensation methods are suitable for the production of the new type of polyamides. For example polyamides are obtained by heating salts of the mixture of isomers of bisaminocyclohexylpropane with dicarboxylic acids under superatmospheric pressure in the absence of oxygen, it being necessary to remove water at least in the final stage of the polycondensation. For more rapid removal of water, inert gas, such as nitrogen, may be passed through or over the polycondensation mixture of the polycondensation may be carried out at subatmospheric pressure. The new type of polyamides may also be prepared by interfacial polycondensation or solution polycondensation of the mixture of isomers of bisaminocyclohexylpropane with the chlorides of dicarboxylic acids provided lactams are not used as starting materials.

Polycondensation may be carried out in the presence of conventional additives, such as chain stoppers, for example carboxylic acids or their derivatives or amines, heat stabilizers, light stabilizers, stabilizers of melt viscosity, optical brighteners, fillers or lubricants.

The new type of clear polyamides may be processed by the conventional methods for thermoplastics and are suitable for the production for example of moldings, such as plates, tubes, rods, stretchable filaments and threads, bristles and a great variety of injection moldings.

The invention is further illustrated by the following examples in which parts and percentages are by weight unless otherwise stated.

EXAMPLE 1

A mixture of 62 parts of bisaminocyclohexylpropane prepared as mentioned above by hydrogenation of dimethyl-bis-(4-hydroxyphenyl)-methane with hydrogen under superatmospheric pressure and at elevated temperature in the presence of a nickel catalyst followed by amination of the resultant dihydroxydicyclohexylpropane compound with ammonia in the presence of hydrogen and a hydrogenation catalyst and consisting of 65% trans, trans isomer, 5% cis, cis isomer and 30% cis, trans isomer, 38 parts of adipic acid and 50 parts of water is placed in an autoclave and the operation of forcing in nitrogen to a pressure of 20 atmospheres gauge and then releasing the pressure is carried out three times. The whole is then heated for two hours at 220° C. under the autogenous pressure. The pressure on the autoclave is then slowly released and the polycondensation mixture is heated to 290° C. and left at this temperature for four hour. Condensation is then continued for another hour under a pressure of 200 mm. Hg.

The polycondensation obtained is glass-clear and tough. The polyamide has a K value of 70 (measured in a 1% solution in concentrated sulfuric acid) and a yield point of 280° C. (measured on a Kofler bench).

The glass temperatures is 196° C. determined by registration of the heat flow in dependence on temperature in a Perkin-Elmer DSC-1 calorimeter at a heating rate of 32° C./min. (1 g. sample) (see K. H. Illers, Makromolekulare Chemie, vol. 1, p. 1). The product, which is completely transparent even in thick layers, is distinguished by great rigidity even at high temperature and does not lose its transparency even after remaining in boiling water of several days or when a melt thereof is cooled slowly, for example in the course of twenty-four hours.

Contrasted with conventional polyamides, the polymer does not contain any monomers or low molecular weight constituents which are capable or being extracted with water, so that the polyamide, after it has been dried, may be immediately processed by injection molding or extrusion in the conventional ways.

EXAMPLE 2

95 parts of the salt of a stereoisomer mixture of bis-aminocyclohexylpropane (69.6% trans, trans, 28.6% cis, trans and 1.8% cis, cis isomer and adipic acid (melting point 243° to 245° C.) according to this invention is heated for two hours at 270° C. with 5 parts of epsilon-caprolactam and 30 parts of water at atmospheric pressure while passing nitrogen over the melt.

Finally the whole is heated to 290° C. within two hours and polycondensation is completed in vacuo within another hour. The polyamide thus obtained is glass-clear and extremely tough. Transparency is not changed in boiling water or by slow cooling of the polymer melt.

The polyamide has a K value of 73 and a yield point of about 255° C.

EXAMPLE 3

57.78 parts of a stereoisomer mixture of bisamino-cyclohexylpropane (78.2% trans, trans, 21.1% cis, trans and 0.7% cis, cis isomer), 42.22 parts of suberic acid or 100 parts of the salt of the two components (melting point 235° C.) and 50 parts of water are polycondensed in an autoclave under the conditions of Example 1. A glass-clear tough polycondensate is obtained having a K value of 72 and a yield point of 265° C.

EXAMPLE 4

20 parts of a salt of adipic acid and hexamethylenediamine and 80 parts of the salt of a stereoisomer mixture of bisaminocyclohexylpropane (63.5% trans, trans, 34.1% cis, trans and 2.3% cis, cis isomer) said diamine mixture being prepared as mentioned above by hydrogenation of dimethyl-bis(4-hydroxyphenyl)methane with hydrogen under atmospheric pressure and at elevated temperature in the presence of a nickel catalyst followed by amination of the resultant dihydroxycyclohexylpropane compound with ammonia in the presence of hydrogen and cobalt as hydrogenation catalyst and adipic acid (melting point of the salt 247° C.) are mixed with 100 parts of water and the whole is condensed as described in Example 2. Condensation is thereafter continued for another half hour at a pressure of 200 to 300 mm. Hg.

The product formed is glass-clear and tough and has a K value of 70 and a glass temperature of 160° C., determined as described in Example 1.

EXAMPLE 5

1500 parts of water, 1.2 parts of potassium hydroxide and 36.8 parts of a stereoisomer mixture of bisamino-cyclohexylpropane (50.8% trans, trans, 42.2% cis, trans and 5.3% cis, cis) are placed in a mixing apparatus having an intense action. A solution of 3.5 parts of iso-phthaloyl chloride in 500 parts of methylene chloride is added to a stirred diamine solution. The reaction mixture is separated, washed with water until it is neutral and dried. 7.2 parts of a white powder is obtained which has a K value of 45 (measured in a 1% solution in concentrated sulfuric acid).

EXAMPLES 6 TO 8 AND COMPARATIVE EXPERIMENTS

Bis(aminocyclohexyl)alkanes and dicarboxylic acids as given below are polycondensed by the method described in Example 1.

EXAMPLE 6

62 parts of a stereoisomer mixture of 2,2-bis(4-amino-cyclohexyl)propane (70.9% trans, trans, 27.3% cis, trans and 1.8% cis, cis isomers) melting between 55° and 60° C. and 38 parts of adipic acid. The resulting polyamide has a glass temperature (second order transition temperature) DSC–1 of 196° C., is glass-clear, very easy to process by methods conventionally used for thermoplastics, viscoelastic, has high strength and exhibits no turbidity upon prolonged boiling in water.

EXAMPLE 7

54.1 parts of a stereoisomer mixture of 2,2-bis(4-amino-cyclohexyl)propane (70.0% trans, trans, 27.3% cis, trans and 1.8% cis, cis isomers) melting between 55 to 60° C. and 45.9 parts of sebacic acid. The resulting polyamide has a glass temperature DSC–1 of 170° C. and the further properties mentioned in Example 6.

EXAMPLE 8

62 parts of a stereoisomer mixture of 2,2-bis(4-amino-cyclohexyl)propane (50.8% trans, trans, 42.2% cis, trans and 5.3% cis, cis isomers) having a melting point of about 50° C. and 38 parts of adipic acid.

The resulting polyamide has a glass temperature DSC–1 of 189° C. and the further properties mentioned in Example 6.

Comparative Experiment A 62 parts of a stereoisomer mixture of 2,2-bis(4-amino-cyclohexyl)propane (25.9% trans, trans, 48.9% cis, trans and 17.4% cis, cis isomers) which is liquid at 25° C. and 38 parts of adipic acid. The resulting polyamide has a glass temperature below 150° C. It is glass-clear, but has poor strength. It is not stable dimensionally at a temperature of 120° C. and unpon storage in water.

Comparative Experiment B 62 parts of a stereoisomer mixture of 2,2-bis(4-amino-cyclohexyl) propane (85.4% trans, trans, 14.0% cis, trans and 0.5% cis, cis isomers) melting at about 65° C. and 38 parts of adipic acid.

The resulting polyamide is crystalline and brittle and cannot be processed by methods used for thermoplastics.

Comparative Experiment C 59 parts of a stereoisomer mixture of bis-(4-amino-cyclohexyl) methane being at 25° C. liquid to semi-solid and having a trans, trans isomer content of 50% and 41 parts of adipic acid. The resulting polyamide is crystalline and opaque and cannot be processed by the methods usual for thermoplastics.

Comparative Experiment D 59 parts of a stereoisomer mixture of bis-(4-amino-cyclohexyl)methane being liquid at 25° C. and having a trans,trans isomer content of 30% and 41 parts of adipic acid.

The resulting polyamide is glass-clear, has poor strength and is not stable dimensionally at elevated temperatures. Its glass temperature is below 150° C. It is unsuitable as an engineering material or fiber intermediate.

Comparative Experiment E 59 parts of a stereoisomer mixture of bis-(4-amino-cyclohexyl)methane being solid at 25° C. and having a trans,trans isomer content of 88% and 41 parts of adipic acid.

The resulting polyamide is crystalline, opaque and difficult to process by the methods conventionally used for thermoplastics. The glass temperature is about 200° C.

Comparative Experiment F 50.9 parts of a stereosiomer mixture of bis-(4-amino-cyclohexyl) methane being solid at 25° C. and having a trans,trans isomer content of 88% and 41 parts of adipic acid.

The resulting polyamide is opaque to non-transparent with a clearly crystalline fraction.

Comparative Experiment G 62 parts of bis(4-amino-3-methyl-cyclohexyl)-methane being liquid at 25° C. and 38 parts of adipic acid.

The resulting polyamide is opaque with a clearly crystalline fraction and is not stable dimensionally.

Comparative Experiment H 58.9 parts of bis(4-amino-3-methyl-cyclohexyl)methane being liquid at 25° C. and 41.1 parts of isophthalic acid.

The resulting polyamide is opaque to translucent and difficult to process by the methods conventionally used for thermoplastics.

We claim:

1. A glass-clear, solid polyamide consisting essentially of the polymeric condensation product of
   (A) a mixture of stereoisomers of 2,2-bis-(4-aminocyclohexyl)-propane comprising 50 to 80% by weight of trans,trans isomers, the remainder being cis,trans and cis,cis isomers with the proviso that the content of cis,cis isomer is less than 10% by weight and
   (B) an aliphatic or carbocylic dicarboxylic acid having from 6 to 10 carbon atoms the optical clarity of said polyamide being stable to boiling water and cooling from the melt in the course of twenty-four hours, said polyamide further having a glass temperature of at least about 160° C., said glass temperature being determined by registration of the heat flow in dependence on temperature in a Perkin-Elmer DSC–1 calorimeter at a heating rate of 32° C./min./1 g. sample.

2. Polyamide according to claim 1, wherein the dicarboxylic acid (B) is adipic acid.

3. A glass-clear, solid polyamide consisting essentially of the polymeric condensation product of
   (A) a mixture of stereoisomers of 2,2-bis-(4-aminocyclohexyl)-propane comprising 50 to 80% by weight of trans,trans isomers, the remainder being cis, trans and cis, cis isomers with the proviso that the content of cis, cis isomer is less than 10% by weight,
   (B) an aliphatic or carbocyclic dicarboxylic acid having from 6 to 10 carbon atoms, and
   (C) 1 to 30% by weight, with reference to the polyamide-forming substances, of adipic acid and hexamethylene diamine in a stoichiometric ratio the optical clarity of said polyamide being stable to boiling water and cooling from the melt in the course of twenty-four hours, said polyamide further having a glass temperature of at least about 160° C., said glass temperature being determined by registration of the heat flow in dependence on temperature in a Perkin-Elmer DSC–1 calorimeter at a heating rate of 32° C./min./1 g. sample.

4. A polyamide according to claim 3 wherein the dicarboxylic acid (B) is adipic acid.

References Cited

UNITED STATES PATENTS 2,512,606    6/1950    Bolton et al. _____ 260—78 R

HAROLD D. ANDERSON, Primary Examiner

U.S. Cl. X.R.

260—30.8 R, 78 L

PO-1050
(5/69)

UNITED STATES PATENT OFFICE
CERTIFICATE OF CORRECTION

Patent No. 3,703,595      Dated Nov. 21, 1972

Inventor(s) GEORG FALKENSTEIN, HANS GEORG PEINE, HELMUT DOERFEL, PAUL RAFF and LUDWIG SCHUSTER It is certified that error appears in the above-identified patent and that said Letters Patent are hereby corrected as shown below:

Col. 6, lines 71 and 72 - read "a trans, trans isomer content of 88% and 41 parts of adipic acid"

and should read: "a trans, trans content of 62% and 49.1 parts of sebacic acid."

Signed and sealed this 20th day of November 1973.

(SEAL)
Attest:

EDWARD M. FLETCHER, JR.
Attesting Officer

RENE D. TEGTMEYER
Acting Commissioner of Patents